United States Patent Office 3,170,320
Patented Feb. 23, 1965

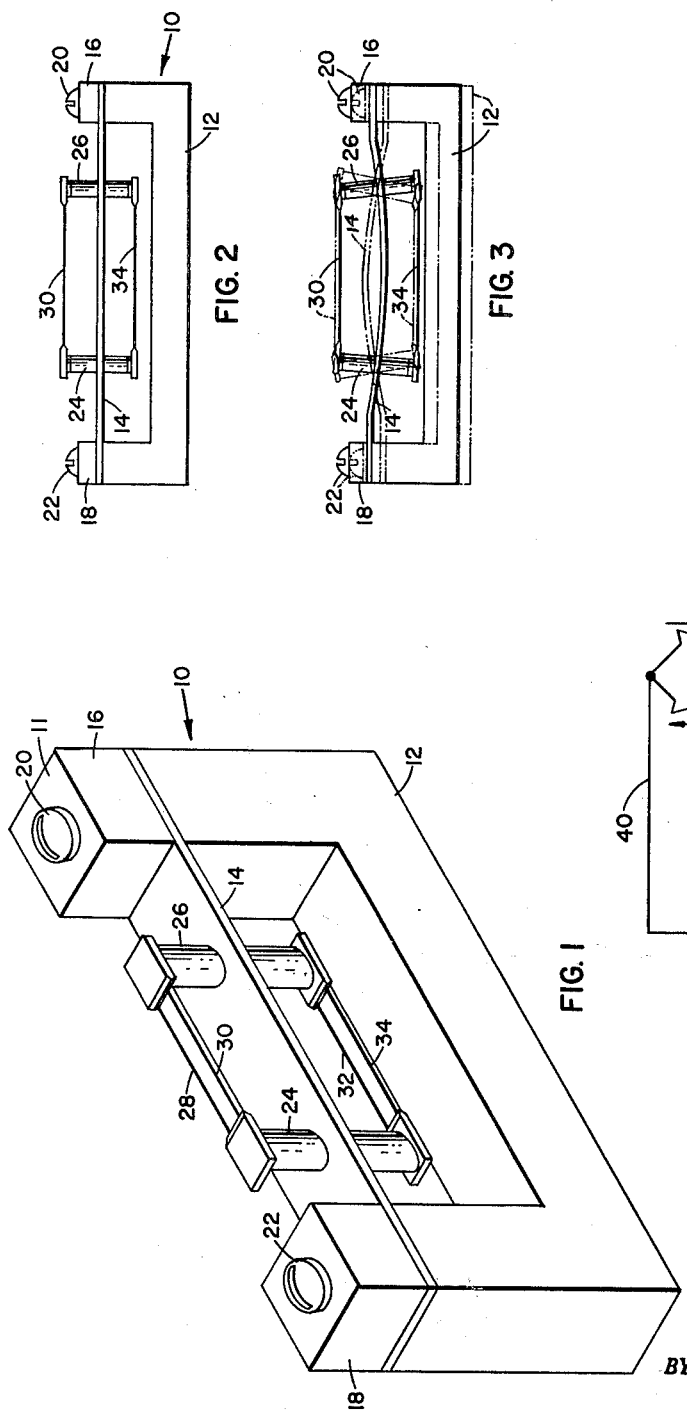

3,170,320
VIBRATION TRANSDUCER
Robert E. Talmo, Pasadena, Calif., assignor, by mesne assignments, to the United States of America as represented by the Secretary of the Army
Filed Feb. 6, 1963, Ser. No. 256,779
4 Claims. (Cl. 73—71.2)

This invention pertains to a vibration measuring device. More particularly, the invention relates to a transducer assembly for creating an electrical deflection comparable to the intensity and amplitude of a vibration phenomena.

An object of the present invention is to provide a vibration transducer which is capable of measuring vibrations over a wide range of frequencies and which will have a relatively high output signal.

Another object of the invention is to provide a vibration transducer which measures both static and dynamic deflections or vibrations.

These and other objects and advantages of the present invention will become apparent from the following detailed description taken in conjunction with the accompanying drawings, wherein;

FIGURE 1 is a perspective view of a device incorporating the principles of the invention.

FIGURE 2 is a side elevation view showing the device in its relaxed position.

FIGURE 3 is a view similar to FIGURE 2 and shows the device deflected with the dot-dash lines indicating deflection in the opposite direction.

FIGURE 4 is a schematic wiring diagram for the device.

Referring now to the drawings, and particularly to FIGURES 1–3 thereof, the transducer 10 of the present invention comprises a U-shaped base member 12 and a thin flat spring element 14 clamped to the upper ends of the arms of base member 12 by blocks 16 and 18 held in place by screws 20 and 22, respectively.

When spring 14 is deflected by acceleration, as by vibration of the mechanism to which base 12 is affixed in the manner illustrated in FIGURE 3, two nodes, or points where the direction of bend of the spring element 14 reverses, occur at points spaced from each support one fourth of the length of the spring between supports. Two posts 24 and 26 are mounted on spring 14, one at each of the two node points. Posts 24 and 26 extend equal amounts above and below spring 14. Four filaments, 28, 30, 32 and 34, of a semiconductor material having a high piezoresistive effect, are stretched between posts 24 and 26. Two of the filaments, 28 and 30, are stretched between the upper ends of posts 24 and 26, the remaining two filaments, 32 and 34, are stretched between the lower ends of the posts.

The filaments 28 through 34 are initially pre-tensioned so that none will ever be in compression regardless of the deflection of spring 14 throughout the normal operating range of the device.

As best seen in FIGURE 4, filaments 28 through 34 are interconnected electrically to form a bridge circuit. One side 40 of the circuit from an exciter 42 is connected to one end of each of filaments 28 and 30. The other side 44 of the exciting circuit is connected to one end of each of filaments 32 and 34. The other ends of filaments 28 and 32 are connected to one side 46 of an output circuit, and the other ends of filaments 30 and 34 are connected to the other side 48 of the output circuit.

In the use of the device base 12 is affixed to the object or structure of which the vibration or acceleration is to be measured. Excitation is then applied by exciter 42 through wires 40 and 44. When the device is in its neutral position, the bridge circuit is balanced so that there will be no output signal. If the object or structure to which the device is affixed moves, the seismic mass of the spring and posts causes a deflection of the spring. The deflection of spring 14 causes posts 24 and 26 to tilt in the manner illustrated in FIGURE 3 resulting in a difference of tension between the upper and lower filaments, thus changing their conductivity due to their inherent piezoresistive characteristics. This change in conductivity of the several filaments unbalances the bridge causing a signal to be set up in the output circuit 46, 48 which signal can be read and interpreted by a meter 49. By the proper analysis of the output signal, both the direction and amplitude of the spring deflection can be determined.

While a preferred embodiment of the present invention has been described herein, it should be noted that various changes may be made in its construction without departing from the spirit of the invention as defined in the appended claims.

The invention having thus been described, what is believed to be new and is desired to be protected by Letters Patent is:

1. A vibration transducer comprising: a U-shaped frame, a thin flat spring clamped across the open end of said frame, a pair of posts connected to said spring at spaced points equidistant from the clamped ends of the spring, a pair of spaced parallel filaments of semiconductor material connecting the tops of said posts, a pair of spaced parallel filaments of semiconductor material connecting the bottoms of said posts, and electrical means for determining the difference in conductivity between the upper and lower filaments due to distortion of the filaments by deflection of the spring.

2. A vibration transducer comprising: a U-shaped frame, a thin flat spring clamped across the open end of said frame, a pair of posts connected to said spring at spaced points equidistant from the clamped ends of the spring, said posts extending equal distances on either side of said spring, a pair of spaced parallel filaments of semiconductor material connecting the tops of said posts, a pair of spaced parallel filaments of semiconductor material connecting the bottoms of said posts, said filaments being interconnected electrically to form a bridge circuit, an exciting circuit connected to said bridge, and an output circuit connected to said bridge.

3. A vibration transducer comprising: a U-shaped frame, a thin flat spring clamped across the open end of said frame, a pair of posts connected to said spring at spaced points equidistant from the clamped ends of the spring, said posts extending equal distances on either side of said spring, a pair of spaced parallel filaments of semiconductor material connecting the tops of said posts, a pair of spaced parallel filaments of semiconductor material connecting the bottoms of said posts, all of said filaments being pretensioned, said filaments being interconnected electrically to form a bridge circuit, an exciting circuit connected to said bridge, and an output circuit connected to said bridge.

4. A vibration transducer comprising: a U-shaped frame, a thin flat spring clamped across the open end of said frame, said spring having two nodes when deflected, a pair of posts connected to said spring one at each of said nodes, said posts extending equal distances on either side of said spring, a pair of spaced parallel filaments of semiconductor material connecting the tops of said posts, a pair of spaced parallel filaments of semiconductor material connecting the bottoms of said posts, all of said filaments being pretensioned, said filaments being interconnected electrically to form a bridge circuit, an exciting circuit connected to said bridge, and an output circuit connected to said bridge.

References Cited by the Examiner

UNITED STATES PATENTS

| 2,453,548 | 11/48 | Statham | 73—517 X |
| 3,031,634 | 4/62 | Vogt | 73—88.5 |
| 3,034,345 | 5/62 | Mason | 73—88.5 |
| 3,089,108 | 5/63 | Gong et al. | 73—88.5 |

OTHER REFERENCES

Boggis: Article in "Journal of Scientific Instruments," August 1950, pp. 212–214.

RICHARD C. QUEISSER, *Primary Examiner.*

JOHN P. BEAUCHAMP, *Examiner.*